(12) United States Patent
Campazzi et al.

(10) Patent No.: US 11,123,962 B2
(45) Date of Patent: Sep. 21, 2021

(54) MULTIFUNCTIONAL ADHESIVE FILM FOR THE SURFACE PROTECTION OF WORKPIECES

(71) Applicants: AIRBUS GROUP SAS, Blagnac (FR); ADHETEC, Tarbes (FR)

(72) Inventors: Elisa Campazzi, Suresnes (FR); Marie-Paule Guillou, Suresnes (FR); Nicolas Mouyen, Tarbes (FR)

(73) Assignees: AIRBUS, Blagnac (FR); ADHETEC, Tarbes (FR)

( * ) Notice: Subject to any disclaimer, the term of this patent is extended or adjusted under 35 U.S.C. 154(b) by 853 days.

(21) Appl. No.: 15/510,684

(22) PCT Filed: Sep. 14, 2015

(86) PCT No.: PCT/FR2015/052454
§ 371 (c)(1),
(2) Date: Jun. 6, 2017

(87) PCT Pub. No.: WO2016/042245
PCT Pub. Date: Mar. 24, 2016

(65) Prior Publication Data
US 2017/0266932 A1    Sep. 21, 2017

(30) Foreign Application Priority Data
Sep. 15, 2014   (FR) ...................... 14 58621

(51) Int. Cl.
*C09J 7/22* (2018.01)
*C09J 7/30* (2018.01)
(Continued)

(52) U.S. Cl.
CPC ............ *B32B 27/06* (2013.01); *B29C 51/002* (2013.01); *B32B 3/14* (2013.01); *B32B 7/05* (2019.01);
(Continued)

(58) Field of Classification Search
None
See application file for complete search history.

(56) References Cited

U.S. PATENT DOCUMENTS

| | | | |
|---|---|---|---|
| 2004/0048024 A1* | 3/2004 | Fleming | ................ C09J 7/403 428/40.1 |
| 2005/0020188 A1* | 1/2005 | Saito | ................ B24B 37/26 451/41 |

(Continued)

FOREIGN PATENT DOCUMENTS

| | | | |
|---|---|---|---|
| DE | 10 2010 030019 A1 | 12/2011 | |
| FR | 2 954 340 A1 | 6/2011 | |

(Continued)

OTHER PUBLICATIONS

Miner Elastomer Data Sheet (Year: 2010).*

(Continued)

*Primary Examiner* — Frank D Ducheneaux
(74) *Attorney, Agent, or Firm* — Im IP LAW; Chai Im; C. Andrew Im (57) ABSTRACT

A multilayer thermoformable film to protect the surface of a workpiece includes an underlayer having first and second faces. The underlayer is made from an adhesive material configured to adhere to the surface of the workpiece by the first face. At least one layer of polymer material is attached to the second face of the adhesive underlayer. The layer of polymer material is resistant to erosion by solid particles and to erosion by liquid particles. It is formed from a polymer material chosen from a polyurethane, a polyether ether ketone and a polyethylene having a very high molecular weight, with a Shore D hardness of between 50 and 65 D. A method of surface protection of the workpiece includes thermoforming the film in a shape adapted to match the (Continued)

shape of at least a portion of the workpiece and applying the film thermoformed onto the surface of the workpiece.

16 Claims, 2 Drawing Sheets

(51) Int. Cl.
| | |
|---|---|
| C09J 7/38 | (2018.01) |
| B29C 51/02 | (2006.01) |
| B64D 45/00 | (2006.01) |
| B32B 3/14 | (2006.01) |
| B32B 7/05 | (2019.01) |
| B32B 7/12 | (2006.01) |
| B32B 27/00 | (2006.01) |
| B32B 27/06 | (2006.01) |
| B32B 27/32 | (2006.01) |
| B32B 27/40 | (2006.01) |
| B32B 37/12 | (2006.01) |
| B32B 27/28 | (2006.01) |
| B29C 51/00 | (2006.01) |
| B29K 105/00 | (2006.01) |
| B29K 71/00 | (2006.01) |
| B29K 75/00 | (2006.01) |
| B29K 23/00 | (2006.01) |
| B29C 63/00 | (2006.01) |
| B64D 15/00 | (2006.01) |

(52) U.S. Cl.
CPC ............... *B32B 7/12* (2013.01); *B32B 27/00* (2013.01); *B32B 27/285* (2013.01); *B32B 27/288* (2013.01); *B32B 27/32* (2013.01); *B32B 27/40* (2013.01); *B32B 37/12* (2013.01); *B64D 45/00* (2013.01); *C09J 7/22* (2018.01); *C09J 7/30* (2018.01); *C09J 7/38* (2018.01); *C09J 7/381* (2018.01); *C09J 7/383* (2018.01); *C09J 7/385* (2018.01); *B29C 63/0017* (2013.01); *B29K 2023/06* (2013.01); *B29K 2023/0658* (2013.01); *B29K 2071/00* (2013.01); *B29K 2075/00* (2013.01); *B29K 2105/0097* (2013.01); *B29K 2105/256* (2013.01); *B29K 2995/0087* (2013.01); *B32B 2250/44* (2013.01); *B32B 2307/554* (2013.01); *B32B 2307/738* (2013.01); *B32B 2371/00* (2013.01); *B32B 2405/00* (2013.01); *B32B 2605/18* (2013.01); *B64D 15/00* (2013.01); *B64D 2045/009* (2013.01); *C09J 2301/122* (2020.08); *C09J 2423/046* (2013.01); *C09J 2475/006* (2013.01)

(56) References Cited

U.S. PATENT DOCUMENTS

| | | | |
|---|---|---|---|
| 2005/0175843 A1* | 8/2005 | Johnson | B32B 27/08 428/423.1 |
| 2008/0311349 A1* | 12/2008 | Johnson | C23C 14/024 428/172 |
| 2013/0101800 A1 | 4/2013 | Campazzi et al. | |
| 2013/0196136 A1 | 8/2013 | Contzen et al. | |

FOREIGN PATENT DOCUMENTS

| | | |
|---|---|---|
| WO | 99/07515 A1 | 2/1999 |
| WO | 2006/055038 A1 | 5/2006 |
| WO | 2008/048201 A2 | 4/2008 |

OTHER PUBLICATIONS

Dodiuk et al., "Hydrophobic and self cleaning coatings," Polymers for Advanced Technologies, Aug. 6, 2007, pp. 746-750, vol. 18, issue 9, Wiley.

* cited by examiner

MULTIFUNCTIONAL ADHESIVE FILM FOR THE SURFACE PROTECTION OF WORKPIECES

RELATED APPLICATIONS

This application is a § 371 application from PCT/FR2015/052454 filed Sep. 14, 2015, which claims priority from French Patent Application No. 14 58621 filed Sep. 15, 2014, each of which is herein incorporated by reference in its entirety.

FIELD OF THE INVENTION

The present invention lies within the field of the surface protection of parts, in particular parts likely to be subjected to erosive conditions and for which it is desirable to maintain the aerodynamic profile. More particularly, the invention relates to an adhesive film of multilayer type enabling such a protection, to a process for the surface protection of a part using such a film, and also to a kit for the surface protection of a part.

One particular field of application of the invention, that will be described in detail in the present description, is the protection of the surface of structural parts of aircraft, these aircraft possibly being of any type, in particular civil or military airplanes, civil or military helicopters intended for use in a terrestrial or maritime environment, drones, etc. However, such a field of application in no way limits the invention, which also applies to any other field in which there is a need to maintain the aerodynamic profile of parts likely to be subjected to erosive conditions during their operation, for example in railway, motor vehicle or else wind turbine fields, in particular for the protection of the leading edges of wind turbine blades.

BACKGROUND OF THE INVENTION

In the aeronautical field, certain structural parts, more particularly the parts commonly referred to as leading edges, such as airplane wings, fins and radomes, vertical or horizontal stabilizers, helicopter rotor blades, etc., are subjected in flight to erosive conditions that may be severe, which are capable of degrading the aerodynamic profile thereof since they lead to the development of undesired roughnesses that oppose the air flows and minimize the laminar flow zone, therefore leading in particular to the increase in fuel costs. It thus proves necessary to protect the surface of the parts in order to prevent such a degradation. These erosive conditions may be of two types: erosion by solid particles, commonly referred to as sand erosion, and erosion by liquid particles, commonly referred to as rain erosion.

The systems proposed by the prior art for protecting the leading edges of aircraft are divided into two types.

The first type is composed of inorganic coatings, for example formed using silicon carbide, or metal coatings, for example titanium or steel fairings. Such coatings demonstrate a good resistance to rain erosion, but they are rapidly eroded by sand. Moreover, they constitute permanent solutions, and the operations for replacing them in the event of damage are long and demanding to carry out.

The second type of coating consists of high-ductility organic coatings, for example based on polyurethane elastomer. It has been proposed by the prior art to use technologies of adhesive films based on such polymers to form outer coatings on the parts, targeting the protection of certain zones against attacks linked to the environment, mainly the exposure to chemical and corrosive substances, such as fuel oil, hydraulic fluids, water, salts, acid rain, etc. In order to preserve their properties, these coatings must be strong and durable in the face of the stresses to which the aircraft is likely to be subjected during its use, in particular to mechanical stresses, to substantial temperature and humidity cycles, to ultraviolet radiation, etc. For this purpose, the outer layer of the coatings proposed by the prior art is formed of high-performance polyurethane. Although such high-ductility organic coatings proposed by the prior art have a good resistance to sand erosion, they do not however have a satisfactory resistance to rain erosion. Moreover, their durability is not very satisfactory: in particular, when an aircraft which is equipped therewith passes through a storm, these coatings are completely deteriorated in around 15 minutes.

Currently, there is thus no effective solution that combines all the properties desirable for maintaining the aerodynamic profile of a part exposed to severe erosive conditions, in particular a good resistance both to rain erosion and to sand erosion.

OBJECT AND SUMMARY OF THE INVENTION

The present invention aims to overcome the drawbacks of the solutions proposed by the prior art for the surface protection of parts, in particular of aircraft leading edges, especially those stated above, by proposing a system that makes it possible to effectively protect the part both against attacks by liquid particles and against attacks by solid particles, including in the cases of severe exposure, while generating a reduced mass impact.

Additional objectives of the invention are that this system has a reduced cost, that it is quick and easy to carry out, in particular to apply and remove, and that it has a good resistance to the mechanical and environmental stresses to which the part is likely to be subjected, in particular to fouling and to UV aging.

Another objective of the invention is to enable a targeted protection of the parts, optimized on the basis of the type of stresses to which the various zones of the part are likely to mainly be exposed.

For this purpose, it is proposed according to the present invention a multilayer thermoformable film for protecting the surface of a part, this film comprising a sublayer of an adhesive material, called adhesive sublayer, capable of adhering to the surface of the part via a first face, and at least one layer made of polymer material(s) attached to a second face of the adhesive sublayer, opposite the first face. The layer made of polymer material(s) is resistant to erosion by solid particles and to erosion by liquid particles.

Such a film, providing the two functions of resistance to erosion by solid particles and resistance to erosion by liquid particles, advantageously makes it possible to protect, by itself alone, the part against these two types of erosion. Such a protection is therefore associated only with a low mass impact, and with reduced cycles for the production of the part. In particular, the film according to the invention preferably has a mass impact less than or equal to 590 g/m$^2$.

Being a film with adhesive properties, it is additionally quick and easy to apply, moreover in all types of environments, in particular in the usual production sites but also in difficult environments, such as in a hangar or in the open air.

According to the invention, the layer made of polymer material(s) that is resistant to erosion by solid particles and to erosion by liquid particles is formed from a single polymer material, having both a function of resistance to erosion by solid particles and a function of resistance to erosion by liquid particles. Such an embodiment in particular has the advantage of a simplified film production process.

The layer made of polymer material(s) that is resistant to erosion by solid particles and to erosion by liquid particles is formed, at least partially, and in particular completely, from a polymer material chosen from a thermoplastic polyurethane (TPU), a polyether ether ketone (PEEK) and an ultra-high molecular weight polyethylene (UHMW-PE), with a Shore D hardness of between 50 and 65 D.

These polymer materials are known per se, and they have good frictional behavior and high wear resistance, and also good chemical resistance and good temperature resistance within the range of temperatures to which the aircraft are subjected in operation, that is to say between around −60° C. and 80° C.

It has also been discovered by the present inventors that, surprisingly, a layer formed from a polymer material chosen from a thermoplastic polyurethane (TPU), a polyether ether ketone (PEEK) and an ultra-high molecular weight polyethylene (UHMW-PE), the Shore D hardness of which is between 50 and 65 D, has, by itself, particularly high performance in terms of resistance to erosion both by solid particles and by liquid particles.

The film according to the invention may comprise a single layer made of polymer material that is resistant to erosion by solid particles and to erosion by liquid particles, or a plurality of such layers. In this configuration, at least one of these layers, and preferably several of these layers, or even all of them, are formed from a polymer material chosen from a thermoplastic polyurethane (TPU), a polyether ether ketone (PEEK) and an ultra-high molecular weight polyethylene (UHMW-PE), with a Shore D hardness of between 50 and 65 D. These various polymer material layers that are resistant to erosion by solid particles and to erosion by liquid particles may be positioned relative to one another, on the adhesive sublayer, in any possible configuration, for example juxtaposed with one another, and/or stacked on one another so as to overlap at least partially.

In one particularly advantageous embodiment of the invention, in terms of the combined resistance to erosion by solid particles and to erosion by liquid particles performance, the layer made of polymer material that is resistant to erosion by solid particles and to erosion by liquid particles is formed of polyether ether ketone with a Shore D hardness of between 50 and 65 D.

In variants of the invention, the layer made of polymer material(s) that is resistant to erosion by solid particles and to erosion by liquid particles is formed by superposition and/or juxtaposition, on the adhesive sublayer, of a plurality of layer portions, including at least one layer portion formed from a first polymer material that is resistant to erosion by solid particles, and at least one layer portion formed from a second polymer material that is resistant to erosion by liquid particles. In particular, the layer portion formed from the first polymer material is more resistant to erosion by solid particles than the layer portion formed from the second polymer material, and the layer portion formed from the second polymer material is more resistant to erosion by liquid particles than the layer portion formed from the first polymer material.

The various layer portions are then preferentially positioned relative to one another on the basis of the specific requirements of the particular part whose surface must be protected, so that each zone of this part likely to be exposed more particularly to solid particle attacks, in particular the zones of low-angle incidence, can be covered by a first layer portion that is resistant to erosion by solid particles, at the same time as each zone of the part likely to be exposed more particularly to liquid particle attacks, in particular the zones of normal incidence, can be covered by a second layer portion that is resistant to erosion by liquid particles.

Thus, according to the present invention, the film is advantageously configured so as to have specific local properties that meet the needs of localized zones of the part to be protected.

More generally, the polymer material(s) incorporated into the composition of the layer that is resistant to rain erosion and to sand erosion is (are) chosen to have good chemical resistance, good thermal resistance and good resistance to ultraviolet, infrared and visible radiation, good resistance to thermal shocks and also good adhesion so as to ensure a good cohesion of the bond at the interface with the adhesive sublayer, in connection with the adhesion characteristics of the material chosen to form this adhesive sublayer, and at the interface between various layer portions with one another where appropriate.

In particular, the mechanical stresses are mainly impacts with solid and liquid particles (erosion) and the air flow that may give rise to a peeling or a delamination of the adhesive film. In order to withstand these stresses, the materials chosen to be incorporated into the composition of the film according to the invention are advantageously chosen for their great cohesion, their hardness between 50 and 65 Shore D and the high capacity of cohesion with the adhesive sublayer.

Where appropriate, the erosion-resistant layer in accordance with the invention may be subjected to a surface treatment that makes it possible to optimize the adhesion of the film on the adhesive sublayer with which it is complexed.

According to particular embodiments, the invention additionally corresponds to the following features, implemented separately or in each of the technically feasible combinations thereof.

In particular embodiments of the invention, the layer made of polymer material(s) that is resistant to erosion by solid particles and to erosion by liquid particles has a thickness between 50 and 500 µm, preferably between 100 and 300 µm, and preferentially equal to 200 µm.

The total thickness of the film according to the invention is additionally preferentially less than 460 µm, so as in particular to ensure its compatibility with the constraints of transparency to radar detection.

In particular embodiments of the invention, the layer made of polymer material(s) that is resistant to erosion by solid particles and to erosion by liquid particles is surface-functionalized, over a section or over the whole of this surface, so as to give it a greater erosion resistance, or a supplementary functionality for protecting the surface of the part. The location of the zone(s) thus functionalized is in particular chosen according to the part to be protected, and to the degree of exposure of each of the zones of this part to each environmental stress during the use thereof, so as to ensure an optimal targeted localized protection. The functionalization may be carried out according to any method known to a person skilled in the art with a view to obtaining the particular effect desired.

The layer made of polymer material(s) that is resistant to erosion by solid particles and to erosion by liquid particles may in particular be subjected to surface metalization or ceramization. It may also be functionalized so as to obtain an anti-icing and/or fouling resistance effect, for example by spraying an anti-icing and/or antifouling coating. The surface functionalization may additionally consist of a surface structuring so as to minimize the drag and promote air intake, for example of a surface texturing to form sawtooth patterns, in particular by microstructuring by lithography or by microthermoforming, or laser microstructuring.

For the same objective of the present invention, of giving the adhesive film additional properties, corresponding to the requirements for protection of the part, or of particular zones of the latter, the film according to the invention may also comprise additional layers, which are juxtaposed and/or superposed, on the adhesive sublayer that supports the assembly, with the layer made of polymer material(s) that is resistant to erosion by solid particles and to erosion by liquid particles.

Thus, in particular embodiments of the invention, the film comprises at least one functional layer made of polymer material having an anti-icing function, that is to say the ability to reduce the formation and adhesion of ice, and/or a fouling resistance function, that is to say that facilitates the cleaning and/or that has a low foulability. Each of such functional layers is superposed and/or juxtaposed, on the adhesive sublayer, with the layer made of polymer material(s) that is resistant to erosion by solid particles and to erosion by liquid particles.

Such additional functions advantageously make it possible to prevent the loss of performance due to the accumulation of ice on the part and to thus improve the operational safety of the latter, and also to limit the fouling of the part and its resulting loss of effectiveness.

Such an additional functional layer may be formed in any per se conventional manner. Generally, the basic principles used for the development of passive antifouling and icephobic surfaces are essentially the same: it is a question of coupling a chemistry that gives a low surface energy and a superhydrophobicity at an optimal roughness. Thus, the functional layer may be based on the technique known as the lotus self-cleaning effect, inspired by the plant, which requires a double roughness at the micrometer and nanometer levels, as described in the publication by Dodiuk et al., Polymers for Advanced Technology, 2007, 18: 746-750; on the solutions that are icephobic due to superhydrophobicity developed by the prior art, as illustrated by the patent document WO 2008/048201; or else on the solution disclosed in document FR 2 954 340, that describes a surface coating composition based on urethane-acrylate oligomers, a diluent and fumed silica, which makes it possible to obtain, after polymerization, a coating whose surface properties induce self-cleaning and anti-icing effects.

Adding an anti-icing functionality to the adhesive film according to the invention proves in particular highly advantageous relative to the anti-icing solutions proposed currently, that use either temporary deicing products, in a form to be sprayed before takeoff, which have the drawbacks of having to be sprayed for each flight, and of generating significant pollution; or long-term deicing products, in the form of a gel to be sprayed, which have the drawbacks of requiring a first application of a primer then a spraying of the product, all in a clean and temperature-controlled zone; or active cleaning and deicing systems acting by heat input, which have the drawback of considerable excess weight. The film according to the invention overcomes all these drawbacks, since it makes it possible in particular to obtain an anti-icing effect easily and long lastingly, with a reduced mass impact.

In particular embodiments of the invention, the film comprises at least one layer made of polymer material having a surface structuring that limits drag in air, superposed and/or juxtaposed, on the adhesive sublayer, with the layer made of polymer material(s) that is resistant to erosion by solid particles and to erosion by liquid particles. Such a layer advantageously makes it possible to achieve fuel savings.

The adhesive film according to the invention may thus be formed from an assembly of various constituent layers, each having different functions for protecting the surface of the part, and all supported by the adhesive sublayer. These various constituent layers may be juxtaposed and/or superposed with one another on this adhesive sublayer.

In particular embodiments of the invention, the various constituent layers of the film that are juxtaposed and/or superposed with one another are joined to one another by adhesive, heat-sealed or co-extruded.

In particular, for a complexing of the layers by stacking, referred to as vertical complexing, the joining of the superposed layers to one another may be carried out by gluing, using specific adhesives compatible with the polymer materials forming the layers. Such a complexing mode makes it possible to ensure a good cohesion of the stack, it is easy to implement and it enables the complexing of a large number of materials. Otherwise, the vertical complexing may be carried out by coextrusion, which is particularly suitable when the polymer materials have comparable thermal properties.

For a complexing of the layers by juxtaposition, referred to as horizontal complexing, the joining of the juxtaposed layers to one another may be carried out by gluing, in particular using an industrial complexing line, or by heat-sealing, the latter technique making it possible in particular to ensure a high cohesion of the layers and to minimize edge effects.

In the case of a horizontal complexing, the various layers juxtaposed with one another are additionally preferably positioned so as to overlap one another in such a way as to protect the adhesive from an external attack, in particular chemical attack, and to avoid any empty space between the layers that could originate either from a drift during the complexing, or from a dimensional variation of the materials exposed to external stresses such as temperature, ultraviolet radiation, humidity, etc. stresses.

The complexing may also be mixed, that is to say that the film may comprise both layers stacked on one another, and layers juxtaposed with one another.

In particular embodiments of the invention, the adhesive sublayer is formed of a pressure-sensitive adhesive material, in particular chosen from materials of the acrylic, rubber and silicone families. This adhesive material preferably has a high capacity for adhesion to the materials commonly used to trim aircraft structures, in particular to bonding primers, to paint and to metals such as aluminum, steel and titanium, and also a strong adhesiveness to the erosion-resistant layer.

Such an embodiment of the adhesive sublayer advantageously makes it possible for both the application of the film to the surface of the part to be protected and the removal thereof to be quick and easy to carry out. The film according to the invention is thus easily replaceable, so it forms a durable solution for the surface protection of the parts. It enables in particular a reduction of the maintenance cycles and of the downtime of the aircraft necessary for this purpose. The replacement of the film according to the invention may additionally be carried out anywhere, including in difficult and demanding environments, such as in basic hangars, in the open air, etc.

The adhesive sublayer is preferentially continuous. Its thickness may in particular be between 25 and 100 µm.

According to another aspect, the present invention relates to a process for protecting the surface of a part, in particular the outer surface of an aircraft part, which comprises the steps of:

thermoforming an adhesive film according to the present invention, corresponding to one or more of the features above, to a shape capable of matching the shape of at least one section of the part, and applying the film thus shaped to the surface of said section of the part.

Preferentially, the process comprises a prior step of determining the configuration of the film, that is to say the number, the functionality and the location, on the adhesive sublayer, of the various functional layers that form it, according to the specific requirements of the particular part to be protected and of the stresses to which the various zones of this part are intended to be subjected in operation, so as to ensure an optimal protection of each of these zones by means of the film according to the invention.

The film according to the invention manufactured according to such a specific configuration therefore advantageously provides a targeted protection of each zone of the part against erosion by solid particles and/or by liquid particles and also, where appropriate, frost and fouling.

Another aspect of the invention relates to a kit for protecting the surface of a part, which comprises a plurality of films according to the invention, corresponding to one or more of the features above, that are thermoformed in order to each match the shape of a section of the part and to together cover the whole of the surface of the part to be protected.

These various films may have the same configuration, or different configurations.

Each of these films is preferentially configured to provide a targeted protection of the zone of the part to which it is intended to be applied, and to the shape of which it is adapted, according to the environmental stresses to which this zone will be exposed in flight.

The kit according to the invention thus constitutes a complete and optimized solution for the surface protection of aircraft structural parts.

In particular embodiments of the invention, the kit additionally comprises one or more tools for applying the plurality of films to the surface of the part, such as a spatula, a brush, etc. It may also comprise usage instructions, in particular as regards the zone of the part to which each film is intended to be applied.

BRIEF DESCRIPTION OF THE DRAWINGS

The features and advantages of the invention will become more clearly apparent in light of the exemplary embodiments hereinbelow, provided simply by way of illustration and without in any way limiting the invention, with the support of FIGS. 1A to 5B, in which.

DETAILED DESCRIPTION OF THE EMBODIMENTS

Figure 1A:
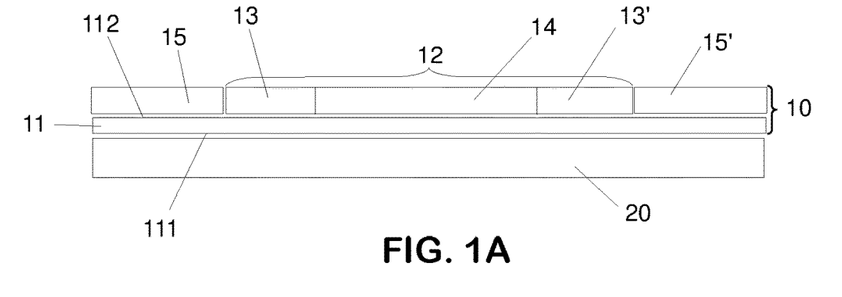
FIG. 1A schematically represents a film according to a first embodiment of the invention.

A first example of a film 10 according to the invention, in which the various constituent layers are juxtaposed ("horizontal complexing"), and of planar conformation, is shown in FIG. 1A. In this figure, as in the following figures, for reasons of clarity, the various elements are represented slightly spaced out from one another, although they are in actual fact tightly applied against one another. Similarly, the relative dimensions of the various constituent elements of the film are in no way representative of the reality.

The film 10 is applied to a part 20, which may in particular be an aircraft structural part likely to be subjected, in operation, to highly erosive conditions, such as a leading edge.

The film 10 comprises an adhesive sublayer 11, formed from a pressure-sensitive adhesive material, for instance of the acrylic or rubber or silicone family. This adhesive sublayer is continuous and it has a thickness between 25 and 100 µm. It comprises a first face 111, applied against the surface of the part 20, and an opposite second face 112, to which the various constituent functional layers of the film 10 are attached.

The film 10 comprises a layer 12 made of polymer material(s) that is resistant to erosion by solid particles and to erosion by liquid particles. This layer 12, referred to as an erosion-resistant layer, is formed of three layer portions: two end layer portions 13, 13' formed from a first polymer material and that are resistant to erosion by solid particles, and a central layer portion 14 formed from a second polymer material and that is resistant to erosion by liquid particles.

The first polymer material and the second polymer material are in particular chosen from the following materials: TPU, PEEK and UHMW-PE.

The film also comprises two anti-icing functional layers 15, 15', that are juxtaposed, on the adhesive sublayer 11, with the erosion-resistant layer 12, on either side of the latter. These anti-icing layers 15, 15' are formed of polymer material.

Any solution known to a person skilled in the art may be used to form the anti-icing layers of the film according to the invention. By way of examples, these layers may comprise:

a coating containing from 25 to 29% of silicon atoms, from 22 to 45% of oxygen atoms and from 26 to 49% of carbon atoms, relative to the total atomic % of the coating, this coating having a structuring, in particular in the form of a pattern of dots or lines;

a coating obtained by plasma polymerization of hexamethyldisiloxane (HMDSO); or a coating containing from 15 to 75% of fluorine atoms and from 25 to 85 atomic % of other components, relative to the total atomic % of the coating, this coating having a structuring, in particular in the form of a pattern of dots or lines.

Figure 1B:
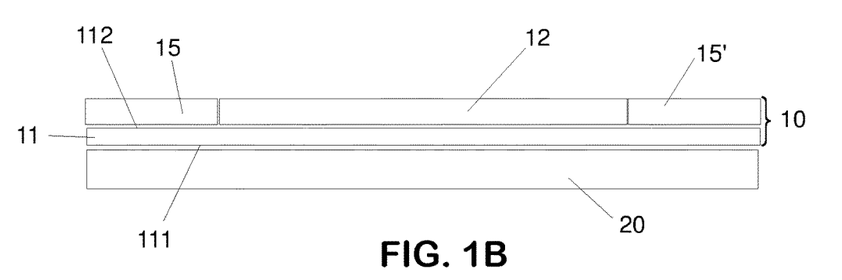
FIG. 1B schematically represents a film according to a second embodiment of the invention.

In variants of the invention, illustrated in FIG. 1B, the film 10 has the same features as those described above, with the exception of the erosion-resistant layer 12, which is in this case formed of a single block of a single polymer material that gives it a good resistance both to sand erosion and to rain erosion. This polymer material is selected from the following materials: TPU, PEEK and UHMW-PE, with a Shore D hardness of between 50 and 65 D.

Figure 2A:
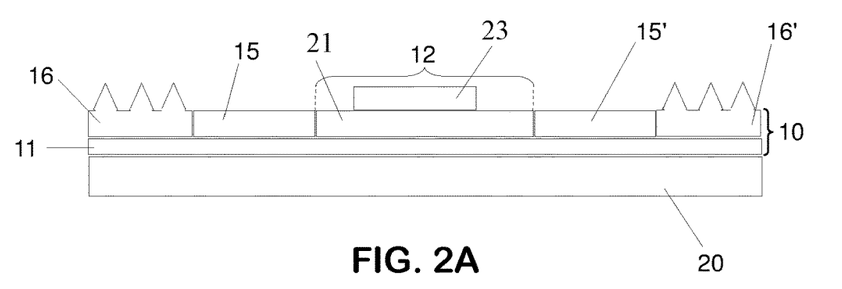
FIG. 2A schematically represents a film according to a third embodiment of the invention.

A third example of a film 10 according to the invention, in which the various constituent layers are juxtaposed or superposed with one another ("mixed complexing"), and of planar conformation, is shown in FIG. 2A.

The film 10 is applied to a part 20, via its adhesive sublayer 11.

It comprises a layer 12 made of polymer material(s) that is resistant to erosion by solid particles and to erosion by liquid particles. This erosion-resistant layer 12 is formed of two layer portions that are superposed on one another on the adhesive sublayer 11: a lower layer portion 21 formed of a first polymer material and that is resistant to erosion by solid particles, and an upper layer portion 23 formed of a second polymer material and that is resistant to erosion by liquid particles.

The film also comprises two anti-icing functional layers 15, 15' made of polymer material, that are juxtaposed, on the adhesive sublayer 11, with the erosion-resistant layer 12, on either side of the latter.

It additionally comprises two functional layers made of polymer material 16, 16' that limit drag in air, which are juxtaposed with the anti-icing functional layers 15, 15', on either side of these layers. These so-called drag reduction layers have a sawtooth surface texturing.

Figure 2B:
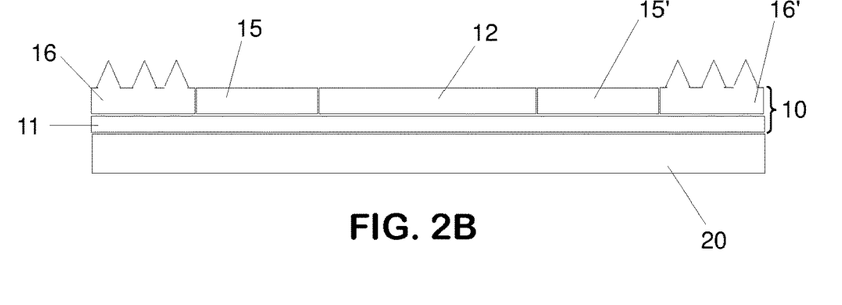
FIG. 2B schematically represents a film according to a fourth embodiment of the invention.

Another example of a film 10 according to the invention, represented in FIG. 2B, is identical to the film described above with reference to FIG. 2A, with the exception of the erosion-resistant layer 12, which is formed of a single polymer material having a high performance in terms of resistance to erosion both by liquid particles and by solid particles, chosen from materials of PU, PEEK and UHMW-PE type, with a Shore D hardness of between 50 and 65 D.

The films 10 shown in FIGS. 1A, 1B, 2A and 2B all have a surface density less than or equal to 590 g/m$^2$. They are easy to apply and remove, and they make it possible to effectively protect the part, in a localized manner, both against attacks by liquid particles and against attacks by solid particles, including in cases of severe exposure.

Generally, the exact configuration of the film 10 is chosen to be suited to the protection requirements of the various zones of the part, so as to ensure an optimal protection thereof.

Figure 3A:
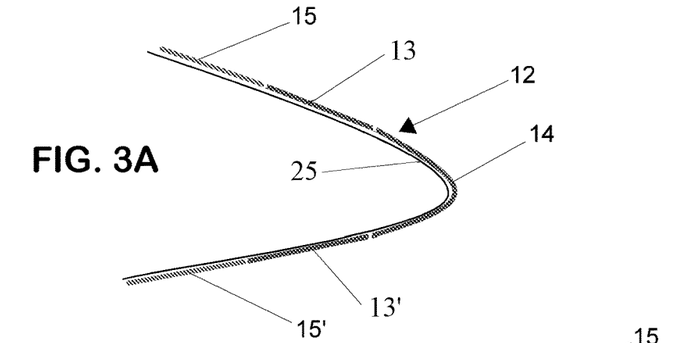
FIG. 3A schematically represents a film according to a fifth embodiment of the invention, applied to an aircraft leading edge.

By way of example, particular configurations of films 10 suitable for the protection of a leading edge 25 of an aircraft are shown in FIG. 3A. In these figures, the various layers and layer portions are represented slightly spaced out from one another for reasons of clarity. However, such a configuration in no way limits the invention, the various layers and layer portions juxtaposed with one another being on the contrary preferentially tightly applied against one another.

In the embodiment illustrated in FIG. 3A, the film 10 comprises an erosion-resistant layer 12 formed of two layer portions 13, 13' made of a first polymer material that are resistant to erosion by solid particles, referred to as sand erosion-resistant layer portions 13, 13', which are juxtaposed on either side of a central layer portion 14 formed of a second polymer material and that is resistant to erosion by liquid particles, referred to as a rain erosion-resistant layer portion 14. It additionally comprises two anti-icing functional end layers 15, 15', which are positioned on either side of the erosion-resistant layer 12.

More particularly, the film 10 is positioned on the part 20 such that the rain erosion-resistant layer portion 14 is positioned at the zone of normal incidence of the part, and the sand erosion-resistant layer portions 13, 13' and the anti-icing layers 15, 15' are positioned at zones of low-angle incidence, thus ensuring an optimal targeted protection of the part with respect to the stresses to which it will be exposed in flight.

Figure 3B:
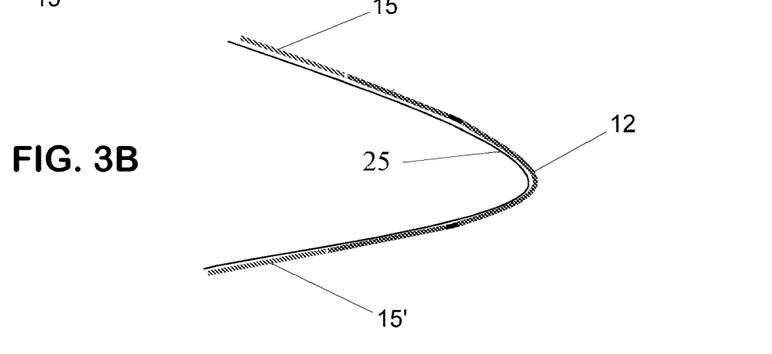
FIG. 3B schematically represents a film according to a sixth embodiment of the invention, applied to an aircraft leading edge.

In the embodiment illustrated in FIG. 3B, the film 10 is identical to the film described above with reference to FIG. 3A, with the exception of the erosion-resistant layer 12, which is formed of a single polymer material having a high performance in terms of resistance to erosion both by liquid particles and by solid particles, chosen from materials of PU, PEEK and UHMW-PE type, with a Shore D hardness of between 50 and 65 D. This layer extends over the zone of normal incidence and the contiguous zones of low-angle incidence of the aircraft part 20.

Erosion Resistance Tests

Parts covered with films in accordance with the present invention were subjected to tests aiming to evaluate their resistance to erosion by liquid particles (rain erosion) and to erosion by solid particles (sand erosion).

A) Experiment 1

Films according to the invention comprising an acrylic adhesive sublayer and an erosion-resistant layer are deposited on an SAE 1008 steel plate or on a painted plate (aluminum 2024 substrate, plated, anodized and painted with an epoxy primer layer, having a thickness between 15 and 25 µm, and finished by a polyurethane layer, having a thickness between 50 and 130 µm), then subjected to the high-pressure cleaner test, according to the protocol described below.

The erosion-resistant layers of the various adhesive films tested are formed as follows: high-hardness thermoplastic polyurethane (TPU) (55 to 60 Shore D) (Film F1), PEEK (65 Shore D) (Film F2), UHMW-PE (50 Shore D) (Film F3).

By way of comparative example, also subjected to the test is a plate covered with an adhesive film comprising a layer of thermoplastic polyurethane proposed by the prior art, with a Shore D hardness of 35, lower than that recommended by the present invention (Film F0).

A.1) Resistance to rain erosion

The duration of the test is 60 s. The objective is to evaluate the resistance of the selected adhesive films to a pressurized water jet in order to simulate a high-velocity "rain" environment. The apparatus that makes it possible to spray the water is a Karcher-type cleaner with a water spray nozzle. There is therefore an impact of a continuous jet and not of drops of water. This test therefore simulates, in a close way, the erosion phenomenon encountered by a leading edge of a helicopter blade or of an airplane wing in a rain environment.

The operating conditions are the following.

Pressure: 150 bar

Nozzle/part distance: 4.7 cm

Angle of impact on the part: 90 degrees

Water flow rate: 9 L/min

For the steel plates, the nozzle/substrate distance is constant. It is the time required for the perforation of the adhesive film that is measured. The test is stopped after 60 s of exposure if the film is not perforated.

For the painted plates, the test time is constant (10 s). It is the nozzle/part distance required for the perforation that is measured.

The results obtained are indicated in table 1 below.

TABLE 1

Results of the rain erosion test with the high-pressure cleaner, where:
Nd = not degraded; ✓ = Film not perforated, not damaged
after 10 s; X = Film perforated after a test time less than or equal to 10 s

| | Parameter measured | | | | | | | |
|---|---|---|---|---|---|---|---|---|
| | Time before 1$^{st}$ degradation | Nozzle/part distance Substrate | | | | | | |
| | Steel plate | Painted plate Nozzle/part distance (cm) | | | | | | |
| | 4 | 4 | 6 | 10 | 20 | 30 | 40 | 50 |
| Film F0 | <1 s | X | X | X | X | X | X | ✓ |
| Film F1 | Nd | X | X | ✓ | ✓ | ✓ | ✓ | ✓ |
| Film F2 | Nd | ✓ | ✓ | ✓ | ✓ | ✓ | ✓ | ✓ |
| Film F3 | Nd | ✓ | ✓ | ✓ | ✓ | ✓ | ✓ | ✓ |

These results demonstrate that the films in accordance with the invention all have a much better behavior, in terms of resistance to rain erosion, than the film F0 proposed by the prior art.

A.2) Resistance to Sand Erosion

The objective is to evaluate the resistance of the films to a pressurized jet of sand in order to simulate a high-velocity "air+sand" environment. The apparatus that makes it possible to spray this jet of sand is an industrial sand blaster.

For this test, the part used is an SAE 1008 steel plate. One such painted plate, without film, is also subjected to the test (Control).

The operating conditions are the following:
Pressure: 1.4 bar
Nozzle/part distance: 4.7 cm
Angle of impact: 90 degrees
Sand: aluminum oxide (diameter 200 μm)
Flow rate: (10 ±3) g/s The results obtained are indicated in table 2 below.

TABLE 2

Results of the sand erosion test

| | Time before 1$^{st}$ degradations | Observations |
|---|---|---|
| Control | 5 to 10 s | — |
| Film F0 | >3 h | Browning |
| Film F1 | 1 to 2 h | Cracking |
| Film F2 | 3 to 6 min | Cracking |
| Film F3 | 1 to 2 h | Cracking |

These results show that the films in accordance with the invention F1 (high-hardness TPU) and F3 (UHMW-PE) offer a behavior in terms of resistance to sand erosion that is comparable to the solution from the prior art F0. They also show the great resistance of the film F2 (PEEK) with respect to bare aircraft paint.

Overall, in terms of combined protection against rain erosion and sand erosion, the films in accordance with the present invention prove much more effective than the low-hardness polyurethane-based films from the prior art.

B) Experiment 2

For this experiment, the adhesive films were tested on a part of simplified configuration representative of an airplane structural part comprising, on a pre-pickled 2024 aluminum plate, an epoxy primer layer (having a thickness between 15 and 25 μm) and a polyurethane top coat (having a thickness between 50 and 100 μm).

The films tested comprise an acrylic adhesive sublayer having a thickness of 50 μm, and an erosion-resistant layer having a thickness between 100 and 250 μm, of the following composition: high-hardness thermoplastic polyurethane (aliphatic polyurethane having a thickness of 200 μm) with a Shore D hardness of 40 to 50 (limits excluded) (Film F4, comparative example); high-hardness thermoplastic polyurethane (aliphatic polyurethane having a thickness of 250 μm) with a Shore D hardness of 50 to 60 (Film F5); high-hardness thermoplastic polyurethane (aliphatic polyurethane having a thickness of 250 μm) with a Shore D hardness of 50 to 60 (with adhesion promoter, Film F5'); semicrystalline PEEK (having a thickness of 100 μm) with a Shore D hardness of 65 (Film F6); semicrystalline PEEK (having a thickness of 100 μm) with a Shore D hardness of 65 (with adhesion promoter, Film F6').

By way of comparative example, the film F0 described above in Experiment 1, proposed by the prior art, was also tested.

B.1) Resistance to Rain Erosion

The test protocol is in accordance with that described in document WO 2009/074514 (technique commonly known under the name P-JET). The operating parameters applied and the results obtained are indicated in table 3 below.

TABLE 3

Results of the rain erosion test

| Film | Pressure (bar) | Speed (m/s) | Number of impacts | Result |
|---|---|---|---|---|
| F0 | 275 | 200 | 20 to 1000 | Perforation at 100 impacts |
| F6 | 350 | 230 | 20 to 1000 | No visible damage |
| F6' | 350 | 230 | 20 to 1000 | No visible damage |
| F5 | 350 | 230 | 20 to 1000 | No visible damage |
| F5 | 350 | 230 | 1000 to 8000 | Perforation at around 7000 |
| F5' | 350 | 230 | 20 to 1000 | No visible damage |
| F5' | 350 | 230 | 2200 to 3000 | Perforation at around 2800 |
| F4 | 275 | 200 | 20 to 1000 | No visible damage |
| F4 | 350 | 230 | 20 to 1000 | No visible damage |
| F4 | 350 | 230 | 1000 to 8000 | Perforation at around 5000 |

It emerges from these results that the adhesive films in accordance with the invention F5 and F6 both have a rain erosion resistance capacity that is greatly improved with respect to the film F0 from the prior art, including in the presence of an adhesion promoter. They additionally have a better performance than the film F4, of lower hardness.

B.2) Resistance to rain erosion after aging

The parts coated with the various films tested were subjected to accelerated UV aging in a conventional aging chamber known under the name QUV, reproducing the damage caused by the UV portion of sunlight, the rain and the dew. The parts were subjected therein to alternating cycles of UV light and humidity (by condensation of water) at controlled high temperatures, according to the following parameters: total time 1000 h (125 cycles of 4 h condensation/4 h UVB).

The test protocol is in accordance with that described in example B.1/ above. The operating parameters applied and the results obtained are indicated in table 4 below.

TABLE 4

Results of the test of rain erosion after aging

| Film | Pressure (bar) | Speed (m/s) | Number of impacts | Result |
|---|---|---|---|---|
| F0 | 275 | 200 | 20 to 1000 | Perforation at 20 impacts |
| F6' | 350 | 230 | 20 to 1000 | No visible damage |
| F6' | 350 | 230 | 6000 to 20000 | Slight roughness at 8000 |
| F5 | 350 | 230 | 1000 to 8000 | Perforation at around 7200 |
| F4 | 350 | 230 | 1000 to 6000 | Perforation at around 2000 |

It emerges from these results that the adhesive films in accordance with the invention still have, after accelerated aging, a rain erosion resistance capacity that is greatly improved with respect to the film F0 from the prior art. The film in accordance with the invention F5 additionally has a better performance than the film F4, of lower hardness.

B.3) Resistance to Sand Erosion

The test protocol is that of the Standard ASTM G76, relating to the tests of erosion by solid particles.

Schematically, solid particles (spherical silica particles having a diameter of 200 μm) are projected by an air flow onto the substrate at a velocity of 55 m/s, at a pressure of 0.280 bar, with a particle rate of 2 g/min and an impact angle that may vary between 20 degrees and 90 degrees. The degree of erosion is determined from the linear portion of the graph of weight loss of the substrate as a function of the time.

The test is carried out at 20°, for 100 g of projected solid particles.

The results obtained are indicated in table 5 below.

TABLE 5

Results of the sand erosion test

| Film | F0 | F4 | F5 | F6 |
|---|---|---|---|---|
| Degree of erosion (mg/g) | 0.0389 | 0.1028 | 0.0974 | 0.0597 |

These results show that the films in accordance with the invention F5 and F6 have a resistance to sand erosion that is slightly worse than that of the film F0 from the prior art, but very high all the same, and better than that of the film F4 having a Shore D hardness lower than that recommended by the present invention. Similar results are obtained after aging.

Figure 5A:
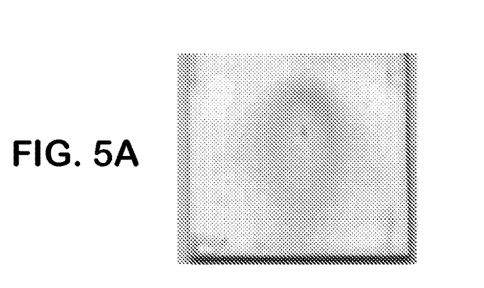
FIGS. 5A and 5B show parts covered with an adhesive film, respectively with a polyurethane-based film in accordance with the invention (FIG. 5A) and with a polyurethane-based film of lower hardness (FIG. 5B), at the end of a sand erosion test for 200 g of projected particles.
Figure 5B:
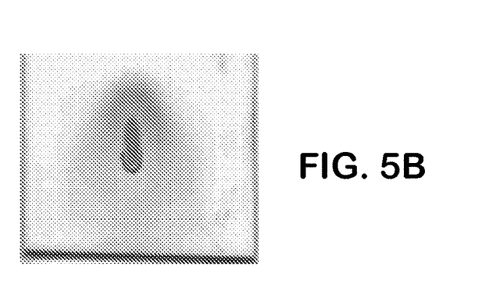

The same test was carried out for 200 g of projected particles, for the films F5 and F4. The results obtained are shown respectively in FIGS. 5A and 5B. It is observed therein that the film F5 has withstood sand erosion much better than the film F4, having a Shore D hardness lower than 50.

Overall, for the combined protection against rain erosion and sand erosion, the films in accordance with the invention perform significantly better than the film from the prior art F0 and the film F4.

C) Experiment 3

For this experiment, the adhesive films were tested on a part of simplified configuration representative of a helicopter structural part comprising, on a pre-pickled 2024 aluminum plate, in succession, an epoxy top coat having a thickness between 15 and 25 μm and a polyurethane top coat having a thickness between 50 and 100 μm, and also, when specified, a layer of adhesion promoter having a thickness of 26 μm.

The films tested comprise an acrylic adhesive sublayer having a thickness of 50 μm, and an erosion-resistant layer having a thickness between 100 and 250 μm, of the following composition: high-hardness thermoplastic polyurethane (aliphatic polyurethane having a thickness of 200 μm) with a Shore D hardness of 40 to 50 (limits excluded) (Film F4, comparative example); high-hardness thermoplastic polyurethane (aliphatic polyurethane having a thickness of 200 μm) with a Shore D hardness of 40 to 50 (limits excluded) with adhesion promoter (Film F4', comparative example); high-hardness thermoplastic polyurethane (aliphatic polyurethane having a thickness of 250 μm) with a Shore D hardness of 50 to 60 (Film F5); high-hardness thermoplastic polyurethane (aliphatic polyurethane having a thickness of 250 μm) with a Shore D hardness of 50 to 60 (with adhesion promoter, Film F5'); semicrystalline PEEK (having a thickness of 100 μm) with a Shore D hardness of 65 (Film F6); semicrystalline PEEK (having a thickness of 100 μm) with a Shore D hardness of 65 (with adhesion promoter, Film F6'); UHMW-PE with a Shore D hardness of 50 (ultra-high molecular weight semicrystalline thermoplastic polymer from the polyolefin family, having a thickness of 250 μm) (Film F7); UHMW-PE with a Shore D hardness of 50 (with adhesion promoter, Film F7').

By way of comparative example, the film F0' as described above in Experiment 1 and with adhesion promoter, proposed by the prior art, was also tested.

C.0.1) Resistance to Rain Erosion

The test protocol is in accordance with that described with reference to Experiment 2. The operating parameters applied and the results obtained are indicated in table 6 below.

TABLE 6

Results of the rain erosion test

| Film | Pressure (bar) | Speed (m/s) | Number of impacts | Result |
|---|---|---|---|---|
| F0' | 275 | 200 | 20 to 1000 | Perforation at 20 impacts |
| F6' | 350 | 230 | 6000 to 20000 | Plastic deformation from 6000 - no visible damage |
| F4 | 350 | 230 | 20 to 7000 | Delamination at 7000 |
| F4' | 350 | 230 | 1000 to 20000 | Plastic deformation from 4000 - perforation at 15 000 |
| F7 | 350 | 230 | 20 to 8000 | Plastic deformation from 20 - no perforation |
| F7' | 350 | 230 | 20 to 8000 | Plastic deformation from 20 - no perforation |
| F5' | 350 | 230 | 20 to 1000 | No visible damage |
| F5' | 350 | 230 | 5200 to 6000 | Plastic deformation from 5400 |

Figure 4A:
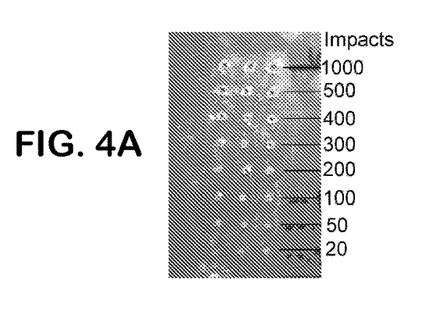
FIGS. 4A and 4B show parts covered with an adhesive film, respectively with a polyurethane-based film from the prior art (FIG. 4A) and with a PEEK-based film in accordance with the invention (FIG. 4B), at the end of a P-JET rain erosion test, each line corresponding to the number of impacts by liquid particles indicated in front of it.
Figure 4B:
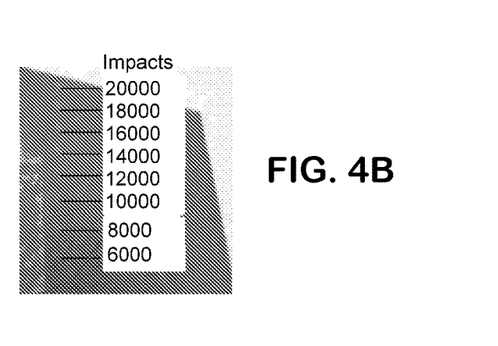

FIGS. 4A and 4B show the parts obtained at the end of the test, respectively for the film from the prior art F0' and for the film in accordance with the invention F6'. On each of these parts, each line corresponds to the number of impacts by the liquid particles indicated in front of it. It is clearly apparent on these figures that the part covered with the film F0' (with adhesion promoter) is greatly damaged at the end of the test, for all the numbers of impacts tested, whereas the part covered with the film F6' (with adhesion promoter) in accordance with the present invention is only very slightly damaged, for much higher numbers of impacts.

It emerges from these results that the adhesive films F7, and F5', F6' and F7' in accordance with the invention all have a much better resistance to rain erosion than the film F0' from the prior art.

C.2) Resistance to Sand Erosion

The test protocol is in accordance with that described with reference to Experiment 2.

The test is carried out at 20°, for 100 g of projected solid particles.

The results obtained are indicated in table 7 below.

TABLE 7

| Results of the sand erosion test | | | | | | |
|---|---|---|---|---|---|---|
| Film | F0' | F6' | F4 | F4' | F7 | F7' |
| Degree of erosion (mg/g) | 0.0282 | 0.0417 | 0.099 | 0.10525 | 0.1023 | 0.09815 |

These results show that the films in accordance with the invention F6', F7 and F7' have a resistance to sand erosion that is slightly worse than that of the film F0' (with adhesion promoter) from the prior art, but very high all the same.

Overall, for the combined protection against rain erosion and sand erosion, here too it is observed that the films in accordance with the invention perform significantly better than the film proposed by the prior art, and than the films F4 and F4', the Shore D hardness of which is lower than 50.

Cohesion Test

A cohesion test was carried out by application of the film F6 according to the invention, or the film F0 from the prior art, to parts covered with a paint primer.

The parts were subjected to an aging test at 75° C. for 20 h, then 180-degree peeling at 100 mm/min.

The results are shown in table 8 below.

TABLE 8

| Results of the cohesion test | | |
|---|---|---|
| Film tested | Tensile force measured | Observation |
| Film F0 | 15 N/cm | Non-compliant measurement due to elongation - 100% delamination of the adhesive |
| Film F6 | 20.7 N/cm | 100% peeling of the adhesive |

It is observed that the film F0 according to the invention has a delamination of the adhesive (cohesive failure) for a force of 15 N/cm, whereas the film F6 in accordance with the invention does not delaminate at 20 N/cm. Only a peeling of the film from its adhesive (adhesive failure) is observed.

The adhesive strength of the PEEK with a Shore D hardness of 65 chosen in accordance with the present invention, measured according to the standard ISO 8510-2, additionally corresponds to a mean load per width of 11.61 (N/cm), versus only 8.19 N/cm for the TPU from the prior art, with a Shore D hardness of 35.

The invention claimed is:

1. A multilayer thermoformable film to protect a surface of a part, comprising:
   a sublayer of an adhesive material, referred to as an adhesive sublayer, comprising first and second faces, the adhesive sublayer configured to adhere to the surface of the part via the first face;
   at least one layer made of polymer material attached to the second face of the adhesive sublayer opposite the first face, and said at least one layer made of polymer material is resistant to erosion by solid particles and to erosion by liquid particles;
   wherein said at least one layer made of polymer material comprises a plurality of layer portions, at least one layer portion is a functional layer made of polymer material having an anti-icing function; and
   wherein said at least one layer made of polymer material is formed from a polymer material selected from a thermoplastic polyurethane, a polyether ether ketone and an ultra-high molecular weight polyethylene, with a Shore D hardness of between 50 and 65 D.

2. The multilayer thermoformable film as claimed in claim 1, wherein said at least one layer made of polymer material has a thickness between 50 and 500 μm.

3. The multilayer thermoformable film as claimed in claim 2, wherein said at least one layer made of polymer material has a thickness between 100 and 300 μm.

4. The multilayer thermoformable film as claimed in claim 3, wherein said at least one layer made of polymer material has a thickness equal to 200 μm.

5. The multilayer thermoformable film as claimed in claim 1, wherein said at least one layer made of polymer material is surface-functionalized.

6. The multilayer thermoformable film as claimed in claim 1, wherein said functional layer made of polymer material has a fouling resistance function.

7. The multilayer thermoformable film as claimed in claim 6, wherein said at least one layer made of polymer material, said functional layer made of polymer material and the adhesive sublayer are joined to one another by an adhesive, heat-sealed to one another, or co-extruded to one another.

8. The multilayer thermoformable film as claimed in claim 1, wherein said at least one layer comprises a second layer made of polymer material having a surface structuring that limits drag in air.

9. The multilayer thermoformable film as claimed in claim 8, wherein said at least one layer made of polymer material, said second layer made of polymer material and the adhesive sublayer are joined to one another by an adhesive, heat-sealed to one another, or co-extruded to one another.

10. The multilayer thermoformable film as claimed in claim 1, wherein the adhesive sublayer is formed of a pressure-sensitive adhesive material.

11. The multilayer thermoformable film as claimed in claim 10, wherein the pressure-sensitive adhesive material is chosen from acrylic, rubber or silicone materials.

12. The multilayer thermoformable film as claimed in claim 1, wherein the adhesive sublayer has a thickness between 25 and 100 μm.

13. A process for protecting a surface of a part, comprises the steps of:
   thermoforming the multilayer thermoformable film as claimed in claim 1 to a shape matching a shape of at least one section of the part; and
   applying the multilayer thermoformable film to the surface of said at least one section of the part.

14. The process of claim 13 is utilized to protect on an outer surface of an aircraft.

15. A kit for protecting a surface of a part, comprising a plurality of multilayer thermoformable films as claimed in claim 1 that are thermoformed such that each multilayer thermoformable film matches a shape of a section of the part and said plurality of multilayer thermoformable films together cover an entire surface of the part to be protected.

16. The kit as claimed in claim 15, further comprising a tool to apply said plurality of multilayer thermoformable films to the surface of the part.

* * * * *